United States Patent Office 3,522,253
Patented July 28, 1970

3,522,253
PRODUCTION OF MONOMETHYL DIALLYL ISOCYANAURATE
Edwin D. Little, Jr., and Charles R. Walter, Jr., Hopewell, Va., assignors to Allied Chemical Corporation, New York, N.Y., a corporation of New York
No Drawing. Filed Oct. 23, 1965, Ser. No. 504,157
Int. Cl. C07d 55/38
U.S. Cl. 260—248                                          3 Claims

ABSTRACT OF THE DISCLOSURE

Monomethyl diallyl isocyanurate is produced by a process which comprises reacting diallyl isocyanurate with dimethyl sulfate. The subject compound has been found to be useful as a monomer in the production of resinous polymers and copolymers.

---

This invention relates to a novel compound, monomethyl diallyl isocyanurate, and the preparation thereof from diallyl isocyanurate.

It is known that amines are readily methylated by dimethyl sulfate, however, it has hitherto not been thought possible to methylate diallyl isocyanurate. Indeed, cyanuric acid resists methylation by dimethyl sulfate.

It is therefore an object of this invention to provide a process whereby a novel compound, monomethyl diallyl isocyanurate will be produced.

This and other objects will flow from and become apparent from the following description of the invention.

In accordance with the present invention, it has now been discovered that monomethyl diallyl isocyanurate is produced by a process which comprises reacting diallyl isocyanurate with dimethyl sulfate as illustrated by the following reaction:

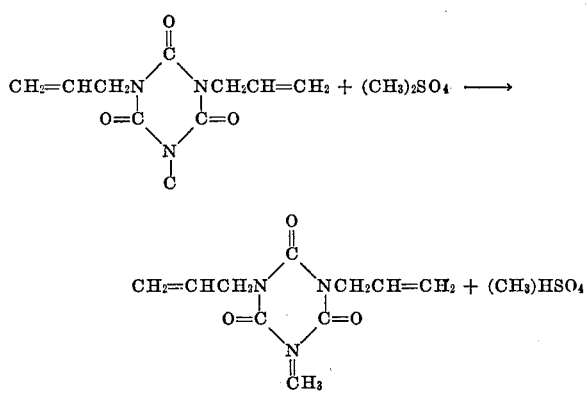

The subject compound has been found to be useful as a monomer convertible into resinous polymers and copolymers having high resistance to chemical action and in addition properties superior to polymers made from known triallyl isocyanurate.

While the proportions of the reactants may range from equimolar amounts all the way to an excess of methyl sulfate (about 100% by weight excess) it has been found preferable to use equimolar amounts of diallyl isocyanurate and dimethyl sulfate.

The reaction is carried out at a temperature between about 20 and about 100° C., preferably about 25° C., in aqueous solution containing, preferably, at least one equivalent of sodium hydroxide. The resultant product is water-insoluble and hence easily recoverable by the mere separation of resulting organic and aqueous layers.

The diallyl isocyanurate reactant may be prepared according to the method of U.S. Pat. No. 3,065,231 to Frazier and Sherman, Nov. 20, 1962, while the dimethyl sulfate may be any of those commercially available.

It is not known what the exact mechanism of the invention reaction is, but it is believed that the presence of the two allyl groups on the cyanuric acid nucleus may be activating the residual hydrogen so that reaction with dimethyl sulfate is possible.

The invention will be described further in conjunction with the following specific examples, but it is to be understood that these are illustrative in nature and not intended to limit the invention thereto.

EXAMPLE 1

Diallyl isocyanurate (126 grams) was placed in a reaction flask equipped with stirrer, dropping funnel and reflux condenser. With reactants at ambient temperature, thirty grams of NaOH in 450 ml. of water was added to produce a clear solution of the sodium salt of diallyl isocyanurate. Dimethyl sulfate (81 grams) was added dropwise over a period of one hour. During the addition of the dimethyl sulfate, the temperature rose from 24° to 38° C. The reaction was completed by bringing the mixture to reflux for fifteen minutes. The mixture was extracted twice with 250-ml. portions of benzene. The resulting benzene solution was dried over sodium sulfate and evaporated to give 121 grams of crude diallyl methyl isocyanurate. Further purification was effected by distillation to give 97.6 grams of product, boiling point 149–150°/1.8–3.0 mm. Hg, $n_D^{25}$ 1.5127–1.5130. Yield of purified product was 72.8% of the theory.

Structure was established by the index of refraction and the infrared spectra of the product. Additional proof was obtained by reducing the compound with hydrogen over palladium catalyst at 25°–60° C. to dipropyl monomethyl isocyanurate and determining the molecular weight (molecular weight calculated, 227; found 228).

EXAMPLE 2

A sample of the monomethyl diallyl isocyanurate prepared according to Example 1 was treated with 2 weight percent benzoyl peroxide, placed in a mold, and cast at 60° C. to form a hard, clear, resilient polymer. This polymer was found to have high resistance to chemical action. For example, it was highly resistant to acids. The polymer was somewhat more plastic than known polymers prepared from triallyl isocyanurate. It would therefore seem to be more suitable for use alone in molded or cast articles.

We claim:

1. A process for producing monomethyl diallyl isocyanurate which comprises reacting diallyl isocyanurate with dimethyl sulfate in an aqueous medium at a temperature between about 20° C. and 100° C. with dimethyl sulfate being present in an amount between about 1 and 2 mols per mol of diallyl isocyanurate.

2. A process according to claim 1 wherein dimethyl sulfate and diallyl isocyanurate are present in about equimolar amounts.

3. A process according to claim 2 wherein said reaction is carried out at a temperature of about 25° C., and at least one equivalent of sodium hydroxide is present in said medium.

References Cited

UNITED STATES PATENTS

| | | | |
|---|---|---|---|
| 3,145,142 | 8/1964 | Lansbury | 260—248 XR |
| 3,332,946 | 7/1967 | Little | 260—248 |

OTHER REFERENCES

Chovnik et al., J. Org. Chem. of the USSR, vol. 1, pp. 1773–4 (1965).

Chovnik et al., Chem. Abstracts, vol. 62, col. 9155, (Apr. 12, 1965).

Frazier et al., J. Org. Chem., vol. 25, pp. 1944–6 (1960).

FMC Product Bulletin 10B, "Cyanuric Acid," FMC Corp., New York (April 1965).

HENRY R. JILES, Primary Examiner

J. M. FORD, Assistant Examiner

U.S. Cl. X.R.

260—77.5, 88.3

PO-1050
(5/69)

UNITED STATES PATENT OFFICE
CERTIFICATE OF CORRECTION

Patent No. 3,522,253      Dated July 28, 1970

Inventor(s) Edwin D. Little, Jr. and Charles R. Walter, Jr.

It is certified that error appears in the above-identified patent and that said Letters Patent are hereby corrected as shown below:

Column 1, line 45 " $\underset{\underset{C}{|}}{N}$ " should be -- $\underset{\underset{H}{|}}{N}$ --.

Column 1, line 55 " $\underset{\underset{CH_3}{||}}{N}$ " should be -- $\underset{\underset{CH_3}{|}}{N}$ --.

SIGNED AND
SEALED
NOV 17 1970

(SEAL)
Attest:

Edward M. Fletcher, Jr.
Attesting Officer

WILLIAM E. SCHUYLER, JR.
Commissioner of Patents